United States Patent
Adelman

(10) Patent No.: US 10,519,633 B2
(45) Date of Patent: Dec. 31, 2019

(54) HOT WATER DELIVERY

(71) Applicant: Uponor Innovation Ab, Virsbo (SE)

(72) Inventor: Duane L. Adelman, Lakeville, MN (US)

(73) Assignee: Uponor Innovation AB, Virsbo (SE)

( * ) Notice: Subject to any disclaimer, the term of this patent is extended or adjusted under 35 U.S.C. 154(b) by 82 days.

(21) Appl. No.: 15/509,938

(22) PCT Filed: Sep. 10, 2015

(86) PCT No.: PCT/US2015/049370
§ 371 (c)(1),
(2) Date: Mar. 9, 2017

(87) PCT Pub. No.: WO2016/040591
PCT Pub. Date: Mar. 17, 2016

(65) Prior Publication Data
US 2017/0298596 A1 Oct. 19, 2017

Related U.S. Application Data

(60) Provisional application No. 62/048,865, filed on Sep. 11, 2014.

(51) Int. Cl.
*E03B 7/04* (2006.01)
*F16K 11/00* (2006.01)
(Continued)

(52) U.S. Cl.
CPC .............. *E03B 7/045* (2013.01); *E03B 1/048* (2013.01); *F16K 19/006* (2013.01);
(Continued)

(58) Field of Classification Search
CPC .......... E03B 7/045; E03B 1/048; E03C 1/041; E03C 1/044; F16K 19/006; F16K 31/002; F16K 31/50
See application file for complete search history.

(56) References Cited

U.S. PATENT DOCUMENTS 2,861,689 A * 11/1958 Lyall .................... F24H 9/0005
210/175
2,982,475 A 5/1961 Dahl
(Continued)

FOREIGN PATENT DOCUMENTS

DE 3500461 9/1986
EP 2 706 154 A1 3/2014
(Continued)

*Primary Examiner* — William M McCalister
(74) *Attorney, Agent, or Firm* — Occhiuti & Rohlicek LLP

(57) ABSTRACT

A domestic pipe system for delivery of hot water includes hot water source (10) and a piping to a faucet (12). The piping comprises a splitter (14), two pipes (20, 22) and a controller (16), the controller having a housing, first and second inlets (24, 26), an outlet (28), and a thermally actuated valve. The first inlet is a permanently open inlet whereas the second inlet is opened depending on the temperature of water arriving at the controller. Stagnant water that cooled down only runs through the first pipe (20) until the temperature exceeds a preset threshold. Than the controller (16) opens the second inlet such that the stagnant cold water from the second pipe can be mixed gradually with the hot water from the first pipe. Thus, the user receives warm water earlier than if both pipes need to be emptied.

20 Claims, 1 Drawing Sheet

(51) Int. Cl.
  *F16K 31/00* (2006.01)
  *E03B 1/04* (2006.01)
  *F16K 31/50* (2006.01)
  *E03C 1/044* (2006.01)

(52) U.S. Cl.
  CPC ............ *F16K 31/002* (2013.01); *F16K 31/50* (2013.01); *E03C 1/044* (2013.01)

(56) References Cited

U.S. PATENT DOCUMENTS

| | | | | |
|---|---|---|---|---|
| 3,400,246 | A | * | 9/1968 | Zob .......................... F24H 1/20 236/20 R |
| 3,754,563 | A | * | 8/1973 | Boals ..................... F16K 17/22 122/14.31 |
| 4,669,653 | A | | 6/1987 | Avelöv |
| 4,892,064 | A | * | 1/1990 | Zappia ................ F28D 15/0233 122/19.2 |
| 6,321,036 | B1 | * | 11/2001 | Huang .................... F24H 1/202 392/441 |
| 2014/0069516 | A1 | * | 3/2014 | Shapira ..................... E03C 1/04 137/88 |
| 2014/0261763 | A1 | * | 9/2014 | Beckman ............ F24D 17/0078 137/337 |

FOREIGN PATENT DOCUMENTS

WO       2006/58392 A1    6/2006
WO       2012/038788 A1    3/2012

* cited by examiner

HOT WATER DELIVERY

CROSS-REFERENCE TO RELATED APPLICATIONS

This is the national stage, under 35 USC 371, of International Application No. PCT/US2015/049370, filed on Sep. 10, 2015, which claims the benefit of the Sep. 11, 2014 priority date of U.S. Provisional Application No. 62/048,865.The contents of each of the above-referenced applications is incorporated herein by reference in its entirety.

FIELD OF DISCLOSURE

This disclosure relates to plumbing fixtures, and in particular, to fixtures for rapid delivery of hot water to an outlet.

BACKGROUND

A length of pipe generally connects a hot water source and a faucet. As hot water stands in this pipe, it cools down. This occurs whether or not the pipe is insulated, the only difference being the rate of cooling. Consequently, when one turns on a faucet, there is a delay associated with delivery of hot water. This delay arises because the cold water in the pipe must be delivered out the faucet so that warm water from the hot water source can replace it.

The length of this delay is governed in part by the volume of the pipe. In the case of a half-inch pipe extending about 50 feet under normal residential water pressure, the delay is on the order of 25-30 seconds before water exiting the pipe is at a temperature that corresponds to that of the hot water source.

The delay associated with having to run the water before receiving hot water wastes water since a considerable volume is discarded. Additionally, the delay is annoying to those with an impatient disposition.

SUMMARY

In one aspect, the invention features an apparatus for delivery of fluid. Such an apparatus includes a first mixing-chamber, a first inlet, a second inlet, and an outlet. The first and second inlets admit corresponding first and second flows into the first mixing-chamber. The outlet permits a third flow to exit the first mixing-chamber. The first, second, and third flows have corresponding first, second, and third flow temperatures. The first and second flows originate from a source maintained at a first temperature. At the second inlet, the second-flow temperature at the second inlet is initially at a second temperature. As the as the second flow continues, the second-flow temperature at the second inlet approaches the first temperature. Meanwhile, the third flow has a third-flow temperature at the outlet that is initially at the second temperature. But as the second flow continues, the third-flow temperature at the outlet approaches the first temperature, wherein the third flow includes the second flow. An extent to which the first flow contributes to the third flow is controllable in response to the third-flow temperature.

Some embodiments include a control system to automatically increase the first flow in response to an extent to which the third temperature has approached the first temperature. Others include a manually-controllable actuator to automatically increase the first flow in response to an extent to which the third-flow temperature has approached the first temperature.

In some embodiments, there is a valve having a valve body and an actuator. The actuator moves the valve body to control controls the extent to which the first flow contributes to the third flow. Among these embodiments are those in which the actuator is thermally controlled, in which case the actuator moves the valve in response to an extent to which the third-flow temperature has approached the first temperature. Others of these embodiments include those in which the actuator is electrically controlled. In these embodiments, the valve further includes a temperature sensor, and the actuator moves the valve in response to a signal from the temperature sensor, that is indicative of an extent to which the third-flow temperature has approached the first temperature. In still others of these embodiments, the actuator is manually controlled to enable the valve body to be moved upon detecting an extent to which the third-flow temperature has approached the first temperature.

Other embodiments include a second mixing-chamber disposed downstream of the first mixing-chamber. This second mixing-chamber includes a first inlet, a second inlet, an outlet, and a valve to control an extent to which flow from the first inlet of the second mixing-chamber mixes with flow from the second inlet of the second mixing-chamber to form a flow that exits through the outlet of the second mixing-chamber. The first inlet of the second mixing-chamber is connected to a source of fluid at a third temperature, and the second inlet of the second mixing-chamber is connected to the outlet of the first mixing-chamber.

Some embodiments include a source of fluid maintained at the first temperature. This source is connected to the first and second inlets of the first mixing-chamber. In some of these embodiments, the source of fluid includes a fluid reservoir. Among these are embodiments in which the source of fluid includes a hot-water tank that is maintained at the first temperature that is higher than the second temperature.

In other embodiments, the first inlet is sized to accommodate a first maximum flow rate and the second inlet is sized to accommodate a second maximum flow rate. These include embodiments in which the first and second maximum flow rates are different and embodiments in which they are the same.

Other embodiments include a control system that controls flow through the first inlet. In some of these embodiments, the control system increase flow through the first inlet in response to detecting that a difference between the first and second temperatures has fallen below a threshold value. In others of these embodiments, the control system causes fluid to begin to flow through the first inlet in response to detecting that a difference between the first and second temperatures has fallen below a threshold value.

Yet other embodiments include a valve having a valve body, configured to transition between a first state, in which it allows flow through the first inlet, and a second state, in which it blocks flow through the first inlet. Among these embodiments are those that also have an actuator coupled to the valve body. This actuator applies a force to move the valve body and thus causes a transition between the first and second states when the third-flow temperature has sufficiently approached the first-flow temperature.

Also among the embodiments are those comprising a faucet that includes a second mixing-chamber. The faucet includes a first inlet and a second inlet. The first inlet of the faucet is connected to the outlet of the first mixing-chamber.

In another aspect, the invention features an apparatus for delivery of hot water that includes a controller having a housing, first and second controller-inlets, a controller outlet, and a thermally actuated valve. The housing defines a mixing chamber for receiving water from the first and second controller-inlets. The first controller-inlet is a permanently open inlet for enabling water to enter the mixing chamber. In contrast, the second controller-inlet is an inlet for enabling water to enter the mixing chamber depending on a position of the thermally-actuated valve, which opens the second controller-inlet when a temperature of water in the mixing chamber exceeds a threshold.

In yet another aspect, the invention features an apparatus for delivery of hot water. Such an apparatus includes a controller that includes a housing, a first controller-inlet, a second controller-inlet, a controller outlet, and a thermally actuated valve. The housing defines a mixing chamber for receiving water from the first and second controller-inlets. The first controller-inlet is a permanently open inlet for enabling water to enter the mixing chamber. The second controller-inlet is an inlet for enabling water to enter the mixing chamber depending on a position of the thermally-actuated valve. The controller outlet is an outlet for enabling water to exit the mixing chamber. In operation, the thermally-actuated valve opens the second controller-inlet when a temperature of water in the mixing chamber exceeds a threshold.

Embodiments include water guides, which can be pipes or hoses, that have different cross-sectional areas. In the case of cylindrical pipes and hoses, this is the same as having different diameters.

In some of these embodiments, the first controller-inlet is configured to receive a first water-guide, and the second controller-inlet is configured to receive a second water-guide. The first water-guide has a first cross-sectional area, the second water-guide has a second cross-sectional area, and the first cross-sectional area is the same as the second cross-sectional area.

In others of these embodiments, the first controller-inlet is configured to receive a first water-guide, the second controller-inlet is configured to receive a second water-guide, the first water-guide has a first cross-sectional area, the second water-guide has a second cross-sectional area, and the first cross-sectional area differs from the second cross-sectional area. Among these are embodiments in which the second cross-sectional area is greater than the first cross-sectional area.

In other embodiments, the thermally-actuated valve includes a valve body and a thermal actuator connected to the valve body. The valve body is disposed to transition between a first position and a second position. In the first position the valve body blocks the second controller-inlet, and, in the second position, the valve body opens the second controller-inlet. The thermal actuator moves the valve body from the first position to the second position in response to an increase in temperature. Among these embodiments are those in which the first position is axially displaced from the second position and those in which it is angularly displaced from the second position. Also among these embodiments are those in which the valve body includes openings facing the controller outlet to enable water in the mixing chamber to flow through the controller outlet and those that further include a spring connected to the valve body, the spring being disposed to urge the valve body into the first position to block the second controller-inlet.

In some embodiments, there is a set point control for controlling a set point at which the thermally actuated valve will open the second controller-inlet. In other embodiments, the set point is not controllable.

Yet other embodiments feature a flow splitter having a splitter inlet, a first splitter-outlet, and a second splitter-outlet. The first splitter-outlet is connected to the first controller-inlet and the second splitter-outlet is connected to the second controller-inlet. Among these embodiments are those that include first and second water guides, with the first water guide connecting the first splitter-outlet to the first controller-inlet, and the second water guide connecting the second splitter-outlet to the second controller-inlet. These water guides have respective first and second volumes. In some embodiments there are different. Among these embodiments are those in which second volume exceeds the first volume. In other embodiments, the first and second volumes are the same.

In another aspect, the invention features an apparatus for reducing waiting time for delivery of hot water to a hot-water outlet. Such an apparatus has a controller having a mixing chamber, first and second controller-inlets, and a controller outlet. The controller outlet is configured to connect to the hot-water outlet. The first and second controller-inlets deliver respective first and second streams of water to the mixing chamber. The first and second streams of water have respective time-varying temperatures that vary according to respective first and second temperature functions. The first and second temperature functions both have a first derivative that is, on the average, positive. The controller includes means for admitting water from the second inlet only when temperature in the mixing chamber exceeds a threshold.

In some embodiments, the first derivative of the first temperature function is greater than the first derivative of the second temperature function.

Other embodiments further include means for setting the threshold.

In yet other embodiments, the means for admitting water from the second inlet only when temperature in the mixing chamber exceeds a threshold includes a thermally actuated valve that selectively blocks the second inlet.

These and other features of the invention will be apparent from the following detailed description and the accompanying figures, in which:

DETAILED DESCRIPTION

Figure 1:
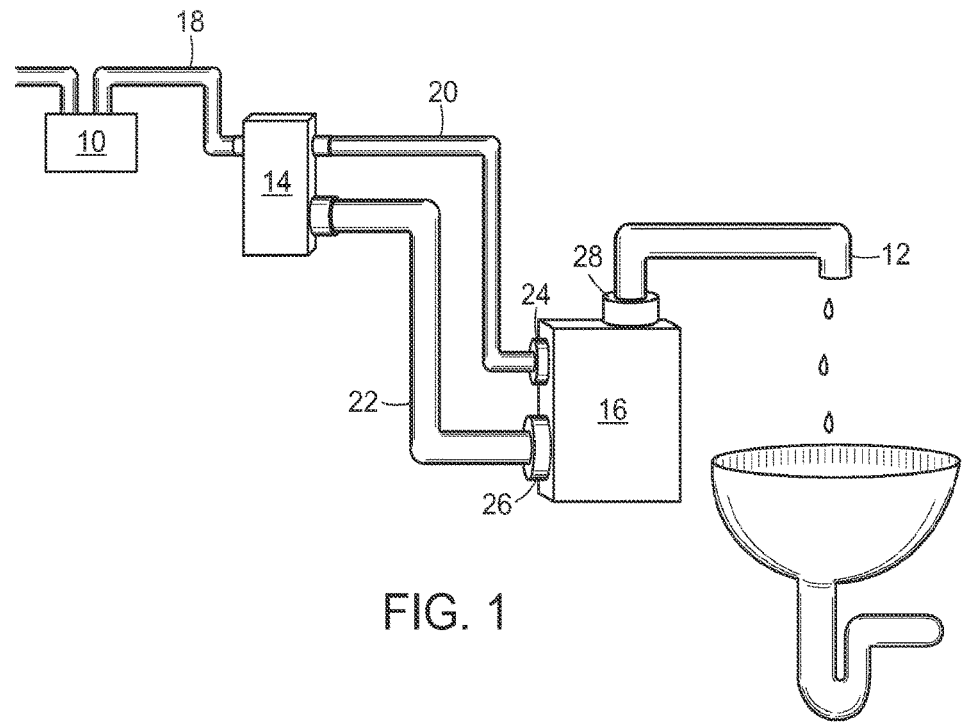
FIG. 1 shows a system in which a controller for controlling hot water flow has been installed.

FIG. 1 shows a hot water source 10 and a faucet 12 connected by a splitter 14 and a controller 16 in series. Although the illustrated embodiment features a faucet 12, any hot-water consuming device can be used. For example, the faucet 12 could be replaced by an appliance, such as a washing machine, or it could be replaced by some other type of plumbing fixture.

A first pipe 18 connects the hot water source 10 to the splitter 14. Second and third pipes 20, 22 connect the splitter 14 to corresponding first and second controller-inlets 24, 26 of the controller 16. In one embodiment, the second pipe 20 has a smaller diameter than the third pipe 22. A controller outlet 28 connects ultimately to the faucet 12.

Figure 2:
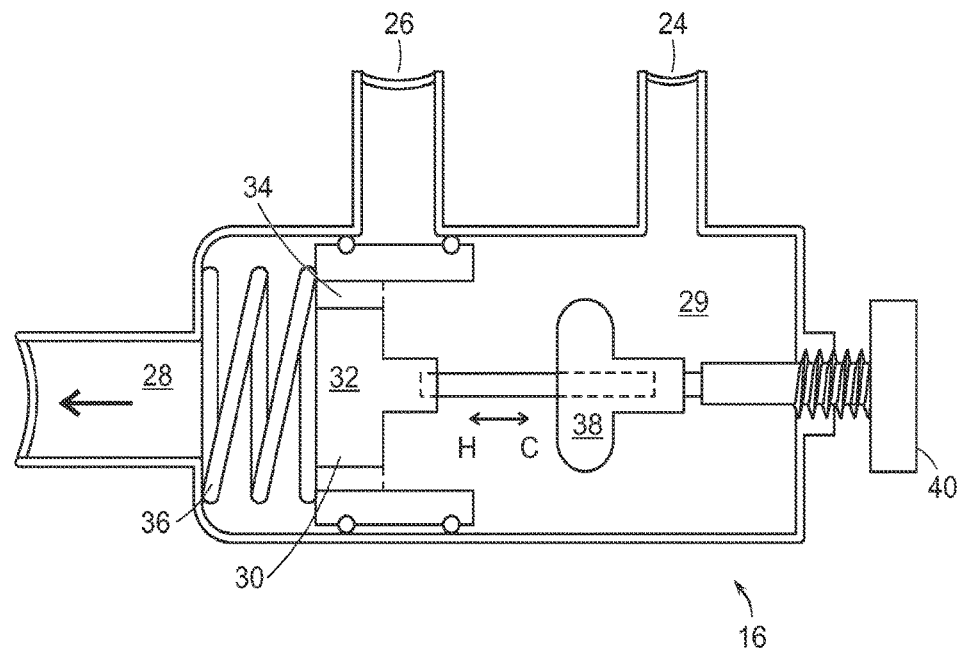
FIG. 2 shows the components of a typical controller of the type used in FIG. 1.

The controller 16, shown in more detail in FIG. 2, features a mixing chamber 29 in which is disposed a thermally actuated valve 30 having a valve body 32. The valve body 32 has holes 34 to enable fluid to pass out the controller output 28. A spring 36 biases the valve body 32 into a first position in which the valve body 32 seals off the second inlet 26. The first inlet 24, on the other hand, is always open.

A thermal actuator 38 has a length that varies with temperature. In particular, the length increases as the temperature increases. The actuator 38 contacts the valve body 32. As a result, when the actuator 38 is exposed to heat, it increases its length and pushes the valve body 32 along a first direction, which is against the force exerted by the spring 36. When the actuator 38 is cooled, it decreases its length, in which case the spring 36 pushes the valve body 32 backward along a second direction opposite to the first direction. A setting knob 40 moves the actuator in and out and thus provides a way to adjust the set point of the controller 16.

In operation, when a user turns on the faucet 12, water from the second pipe 20 flows into the mixing chamber 29 through the first inlet 24, and out the holes 34 in the valve body 32 to the controller outlet 28. This water is initially cold. However, after a time that depends on the volume of the second pipe 20 between the controller and the mixer, the water will begin to run hot. If the second pipe is narrow, this volume is small. As a result, hot water will begin to come out the faucet 12 very quickly. Of course, since the diameter is small, the volume rate of flow will be low.

However, as the water in the chamber 29 heats up, the actuator 38 will lengthen and slowly push the valve body 32 in the first direction. This will gradually open the second inlet 26. As the second inlet 26 is gradually opened, a little bit of water from the third pipe 22 begins to enter the mixing chamber 29. This water is still cold. However, since the water in the chamber 29 is already hot, this cold water will mix with the hot water. Meanwhile, since water is now running in the third pipe 22, the water temperature in the third pipe 22 will slowly climb. Eventually, the water temperature in the third pipe 22 will be the same as that in the second pipe 20, at which point the second inlet 26 will be fully opened.

The principle of the invention is independent of the relative sizes of the second and third pipes 20, 22. Although having the second pipe 20 be narrower than the third pipe 22 is advantageous, the principle of dividing the flow into two pipes to decrease the hot water waiting time is applicable where the second and third pipes 20, 22 have the same diameter.

In effect, the temperatures of water flowing in the first and second pipes 20, 22 are defined by corresponding temperature functions. Assuming the pipes 20, 22 have reached thermal equilibrium with the environment, the temperature functions in both cases will have initial values equal to the ambient temperature. Because the pipes 20, 22 are connected to a hot water source 10, the ambient-temperature water will gradually be replaced by hot water. The temperature functions will therefore asymptotically approach the same value, which corresponds to the temperature of the hot water source 10. However, the average derivative for the temperature functions will differ. This means that one of the two pipes 20, 22 will reach the hot water temperature sooner.

The foregoing apparatus thus has, among its advantages, the ability to deliver hot water to where it is needed faster than a conventional hot-water delivery system. An additional advantage is that there is less wasted water because one does not have to waste as much of the standing cold water in a hot-water pipe.

Although the system has been described in terms of shortening the delivery time for hot water, it should be understood that it also works when the roles of hot water and cold water are reversed.

Having described the invention, and a preferred embodiment thereof, what is claimed as new, and secured by Letters Patent is:

1. An apparatus for delivery of fluid, said apparatus comprising a mixing chamber, a first inlet, a second inlet, and an outlet, wherein said first inlet admits a first flow into said mixing chamber, wherein said second inlet admits a second flow into said mixing chamber, and wherein said outlet permits a third flow to exit said mixing chamber, wherein said first flow has a first-flow temperature, wherein said second flow has a second flow temperature, wherein said third flow has a third flow temperature, wherein said first flow and said second flow originate from a source maintained at a first temperature, wherein said second-flow temperature at said second inlet is initially at a second temperature, wherein as said second flow continues, said second-flow temperature at said second inlet approaches said first temperature, wherein said third flow has a third-flow temperature at said outlet that is initially at said second temperature, wherein as said second flow continues, said third-flow temperature at said outlet approaches said first temperature, wherein said third flow comprises said second flow, and wherein an extent to which said first flow contributes to said third flow is controllable in response to said third-flow temperature, wherein said fluid comprises hot water, wherein said apparatus comprises a controller, wherein said controller comprises a housing, said first inlet, said second inlet, said outlet, and a thermally actuated valve, wherein said housing defines a mixing chamber for receiving water from said first and second inlets, wherein said first inlet is a permanently open inlet for enabling water to enter said mixing chamber, wherein said second inlet is an inlet for enabling water to enter said mixing chamber depending on a position of said thermally-actuated valve, wherein said controller outlet is an outlet that enables water to exit said mixing chamber, and wherein said thermally-actuated valve opens said second inlet when a temperature of water in said mixing chamber exceeds a threshold.

2. The apparatus of claim 1, further comprising a control system that controls flow through said first inlet, wherein in response to detecting that a difference between said first and second temperatures has fallen below a threshold value, said control system increases flow through said first inlet.

3. The apparatus of claim 1, further comprising a valve having a valve body, wherein said valve body is configured to transition between a first state and a second state, wherein, in said first state, said valve body allows flow through said first inlet and through said second inlet, and wherein, in said second state, said valve body blocks flow through said first inlet.

4. The apparatus of claim 3, further comprising an actuator coupled to said valve body, wherein said actuator applies a force to move said valve body, wherein said actuator causes a transition between said first and second states when said third-flow temperature has sufficiently approached said first-flow temperature.

5. The apparatus of claim 1, wherein said first inlet is configured to receive a first water-guide, wherein said second inlet is configured to receive a second water-guide, wherein said first water-guide has a first cross-sectional area, wherein said second water-guide has a second cross-sectional area, and wherein said first cross-sectional area is the same as said second cross-sectional area.

6. The apparatus of claim 1, wherein said first inlet is configured to receive a first water-guide, wherein said second inlet is configured to receive a second water-guide, wherein said first water-guide has a first cross-sectional area, wherein said second water-guide has a second cross-sectional area, and wherein said first cross-sectional area differs from said second cross-sectional area.

7. The apparatus of claim 6, wherein said second cross-sectional area is greater than said first cross-sectional area.

8. The apparatus of claim 1, said thermally-actuated valve comprises a valve body and a thermal actuator, wherein said thermal actuator is connected to said valve body, wherein said valve body is disposed to transition between a first position and a second position, wherein in said first position said valve body blocks said second inlet, wherein in said second position said valve body opens said second inlet, and wherein said thermal actuator moves said valve body from said first position to said second position in response to an increase in temperature.

9. The apparatus of claim 8, wherein said first position is axially displaced from said second position.

10. The apparatus of claim 8, wherein said first position is angularly displaced from said second position.

11. The apparatus of claim 8, wherein said valve body comprises openings facing said controller outlet to enable water in said mixing chamber to flow through said controller outlet.

12. The apparatus of claim 8, further comprising a spring connected to said valve body, wherein said spring is disposed to urge said valve body into said first position to block said second inlet.

13. The apparatus of claim 1, further comprising a set point control for controlling a set point at which said thermally actuated valve will open said second inlet.

14. The apparatus of claim 1, further comprising a flow splitter having a splitter inlet, a first splitter-outlet, and a second splitter-outlet, wherein said first splitter-outlet is connected to said first inlet of said mixing chamber and said second splitter-outlet is connected to said second inlet of said mixing chamber.

15. The apparatus of claim 14, further comprising a first water guide and a second water guide, wherein said first water guide connects said first splitter-outlet to said first inlet, and said second water guide connects said second splitter-outlet to said second inlet.

16. The apparatus of claim 15, wherein said first water guide has a first volume, wherein said second water guide has a second volume, and wherein said first volume differs from said second volume.

17. The apparatus of claim 16, wherein said second volume exceeds said first volume.

18. The apparatus of claim 15, wherein said first water guide has a first volume, said second water guide has a second volume, and said first volume equals said second volume.

19. The apparatus of claim 1, wherein said first-flow temperature is a time-varying temperature that varies according to a first temperature function, wherein said second-flow temperature is a time-varying temperature that varies according to a second temperature function, wherein said first temperature function has a first derivative that is, on average, positive, and wherein said second temperature function has a first derivative that is, on average, positive.

20. The apparatus of claim 19, wherein said first derivative of said first temperature function is greater than said first derivative of said second temperature function.

* * * * *